United States Patent
Li

(10) Patent No.: US 11,210,673 B2
(45) Date of Patent: Dec. 28, 2021

(54) TRANSACTION FEATURE GENERATION

(71) Applicant: Advanced New Technologies Co., Ltd., Grand Cayman (KY)

(72) Inventor: Longfei Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/803,150

(22) Filed: Feb. 27, 2020

(65) Prior Publication Data

US 2020/0380524 A1 Dec. 3, 2020

Related U.S. Application Data

(63) Continuation of application No. PCT/CN2020/070847, filed on Jan. 8, 2020.

(30) Foreign Application Priority Data

May 29, 2019 (CN) .......................... 201910457803.2

(51) Int. Cl.
*G06Q 20/40* (2012.01)
*G06F 16/9038* (2019.01)
(Continued)

(52) U.S. Cl.
CPC ....... *G06Q 20/4016* (2013.01); *G06F 16/906* (2019.01); *G06F 16/9038* (2019.01);
(Continued)

(58) Field of Classification Search
CPC ................................................ G06Q 20/4016
See application file for complete search history.

(56) References Cited

U.S. PATENT DOCUMENTS 9,336,490 B2 5/2016 McKay et al.
9,990,639 B1 * 6/2018 Kong ..................... G06Q 50/16
(Continued)

FOREIGN PATENT DOCUMENTS

GN 106709508 5/2017
GN 109819282 5/2019
GN 110263821 9/2019

OTHER PUBLICATIONS

Rosaria Silipo, "Fraud Detection Using a Neural Autoencoder", 2019. (Year: 2019).*

(Continued)

*Primary Examiner* — Jacob C. Coppola
*Assistant Examiner* — Timothy Paul Sax
(74) *Attorney, Agent, or Firm* — Fish & Richardson P.C.

(57) ABSTRACT

The present specification discloses a method and an apparatus for training a transaction feature generation model, and a method and an apparatus for generating a transaction feature. The method for generating a transaction feature can include the following: obtaining a target dataset, where the target dataset includes some pieces of transaction data; obtaining some original features of the transaction data and determining one or more combination methods for the original features; determining a feature vector of a new feature that is obtained by combining the original features based on each combination method; inputting the feature vector into a trained transaction feature generation model, and outputting a prediction result of the new feature; and selecting some new features whose prediction results meet a specified condition as transaction features generated for the target dataset.

17 Claims, 7 Drawing Sheets

(51) Int. Cl.
*G06F 16/906* (2019.01)
*G06F 17/18* (2006.01)
*G06N 3/08* (2006.01)
*G06N 5/02* (2006.01)

(52) U.S. Cl.
CPC ............ *G06F 17/18* (2013.01); *G06N 3/088* (2013.01); *G06N 5/025* (2013.01)

(56) References Cited

U.S. PATENT DOCUMENTS

| | | | | |
|---|---|---|---|---|
| 10,484,532 | B1* | 11/2019 | Newman | H04W 12/12 |
| 2014/0328527 | A1* | 11/2014 | Zhou | G06K 9/66 382/131 |
| 2018/0060893 | A1* | 3/2018 | Omer | G06F 17/153 |
| 2019/0244064 | A1* | 8/2019 | Mahto | G06K 9/6232 |
| 2019/0295087 | A1* | 9/2019 | Jia | H04L 67/22 |
| 2019/0333069 | A1* | 10/2019 | Noble | G06Q 20/405 |
| 2019/0347473 | A1* | 11/2019 | Saikou | G06T 7/00 |
| 2020/0117975 | A1* | 4/2020 | Harang | G06K 9/6267 |
| 2020/0202179 | A1* | 6/2020 | Rajarathinam | G06N 3/0454 |

OTHER PUBLICATIONS

Benard Wiese, "Credit Card Transactions, Fraud Detection, and Machine Learning: Modelling Time with LSTM Recurrent Neural Networks", 2009. (Year: 2009).*

Remi Domingues, "Machine Learning for Unsupervised Fraud Detection", 2015 (Year: 2015).*

Lukas Frei, "Detecting Credit Card Fraud Using Machine Learning", Jan. 15, 2019 (Year: 2019).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report and Written Opinion in PCT Appln No. PCT/CN2020/070847, dated Apr. 13, 2020, 18 pages (with English translation).

* cited by examiner

TRANSACTION FEATURE GENERATION

CROSS-REFERENCE TO RELATED APPLICATIONS

This application is a continuation of PCT Application No. PCT/CN2020/070847, filed on Jan. 8, 2020, which claims priority to Chinese Patent Application No. 201910457803.2, filed on May 29, 2019, and each application is hereby incorporated by reference in its entirety.

TECHNICAL FIELD

The present specification relates to the field of machine learning technologies, and in particular to a method and an apparatus for training a transaction feature generation model, and a method and an apparatus for generating a transaction feature.

BACKGROUND

In the field of machine learning technologies, features input into a machine learning model usually depend on artificial experience summary. It requires technicians to have a lot of prior knowledge, and a lot of time needs to be consumed for verification, causing low feature generation efficiency.

SUMMARY

The present specification provides a method and an apparatus for training a transaction feature generation model, and a method and an apparatus for generating a transaction feature.

The present specification is implemented by using the following technical solutions:

A method for generating a transaction feature is provided, where the transaction feature is used to identify an illegal transaction, and the method includes the following: obtaining a target dataset, where the target dataset includes some pieces of transaction data; obtaining some original features of the transaction data and determining one or more combination methods for the original features; determining a feature vector of a new feature that is obtained by combining the original features based on each combination method; inputting the feature vector into a trained transaction feature generation model, and outputting a prediction result of the new feature; and selecting some new features whose prediction results meet a specified condition as transaction features generated for the target dataset.

A method for training a transaction feature generation model includes the following: obtaining a sample dataset, where the sample dataset includes some pieces of sample transaction data with a transaction label, and the transaction label is used to mark whether the corresponding sample transaction data is an illegal transaction; obtaining some original features of the sample transaction data and determining one or more combination methods for the original features; determining a feature vector of a new feature that is obtained by combining the original features based on each combination method; calculating a difference between the new feature and the transaction label as a feature label of the new feature; and training the transaction feature generation model based on the feature vector and the feature label of the new feature.

A feature generation method includes the following: obtaining a target dataset, where the target dataset includes some pieces of data; obtaining some original features of the data and determining one or more combination methods for the original features; determining a feature vector of a new feature that is obtained by combining the original features based on each combination method; inputting the feature vector into a trained feature generation model, and outputting a prediction result of the new feature; and selecting some new features whose prediction results meet a specified condition as features generated for the target dataset.

An apparatus for generating a transaction feature is provided, where the transaction feature is used to identify an illegal transaction, and the apparatus includes the following: a dataset acquisition unit, configured to obtain a target dataset, where the target dataset includes some pieces of transaction data; a feature acquisition unit, configured to obtain some original features of the transaction data and determine one or more combination methods for the original features; a feature combination unit, configured to determine a feature vector of a new feature that is obtained by combining the original features based on each combination method; a feature prediction unit, configured to input the feature vector into a trained transaction feature generation model, and output a prediction result of the new feature; and a feature generation unit, configured to select some new features whose prediction results meet a specified condition as transaction features generated for the target dataset.

An apparatus for training a transaction feature generation model includes the following: a sample acquisition unit, configured to obtain a sample dataset, where the sample dataset includes some pieces of sample transaction data with a transaction label, and the transaction label is used to mark whether the corresponding sample transaction data is an illegal transaction; a feature acquisition unit, configured to obtain some original features of the sample transaction data and determine one or more combination methods for the original features; a feature combination unit, configured to determine a feature vector of a new feature that is obtained by combining the original features based on each combination method; a difference calculation unit, configured to calculate a difference between the new feature and the transaction label as a feature label of the new feature; and a model training unit, configured to train the transaction feature generation model based on the feature vector and the feature label of the new feature.

An apparatus for generating a transaction feature includes the following: a processor; and a memory, configured to store a machine executable instruction, where by reading and executing a machine executable instruction that is stored in the memory and corresponds to generation logic of the transaction feature, the processor is enabled to perform the following operations: obtaining a target dataset, where the target dataset includes some pieces of transaction data; obtaining some original features of the transaction data and determining one or more combination methods for the original features; determining a feature vector of a new feature that is obtained by combining the original features based on each combination method; inputting the feature vector into a trained transaction feature generation model, and outputting a prediction result of the new feature; and selecting some new features whose prediction results meet a specified condition as transaction features generated for the target dataset.

An apparatus for training a transaction feature generation model includes the following: a processor; and a memory, configured to store a machine executable instruction, where by reading and executing a machine executable instruction that is stored in the memory and corresponds to training logic of the transaction feature generation model, the processor is enabled to perform the following operations: obtaining a sample dataset, where the sample dataset includes some pieces of sample transaction data with a transaction label, and the transaction label is used to mark whether the corresponding sample transaction data is an illegal transaction; obtaining some original features of the sample transaction data and determining one or more combination methods for the original features; determining a feature vector of a new feature that is obtained by combining the original features based on each combination method; calculating a difference between the new feature and the transaction label as a feature label of the new feature; and training the transaction feature generation model based on the feature vector and the feature label of the new feature.

It can be seen from the previous description that, in some implementations, the original features of the data can be combined to obtain some new features, and then the trained feature generation model is used to predict the new features, and some new features whose prediction results meet the specified condition can be selected as the newly generated features for later data prediction, thereby automatically generating features and greatly improving feature generation efficiency.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Implementations described in the following example implementations do not represent all implementations consistent with the present specification. On the contrary, the implementations are only examples of apparatuses and methods that are described in the appended claims in detail and consistent with some aspects of the present specification.

The terms used in the present specification are merely for illustrating specific implementations, and are not intended to limit the present specification. The terms "a" and "the" of singular forms used in the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present specification to describe various types of information, the information should not be limited by these terms. These terms are only used to differentiate between information of the same type. For example, without departing from the scope of the present specification, first information can also be referred to as second information, and similarly, the second information can also be referred to as the first information. Depending on the context, for example, the word "if" used here can be explained as "while", "when", or "in response to determining".

According to the solutions for generating a transaction feature provided in the present specification, the original features of the transaction data can be combined to obtain some new features, and then the trained transaction feature generation model is used to predict the new features, and some new features whose prediction results meet the specified condition can be selected as the newly generated features for later illegal transaction identification, thereby automatically generating transaction features and greatly improving transaction feature generation efficiency.

The following separately describes the specific implementation process of the present specification from the perspective of training a transaction feature generation model and from the perspective of generating a transaction feature.

Figure 1:
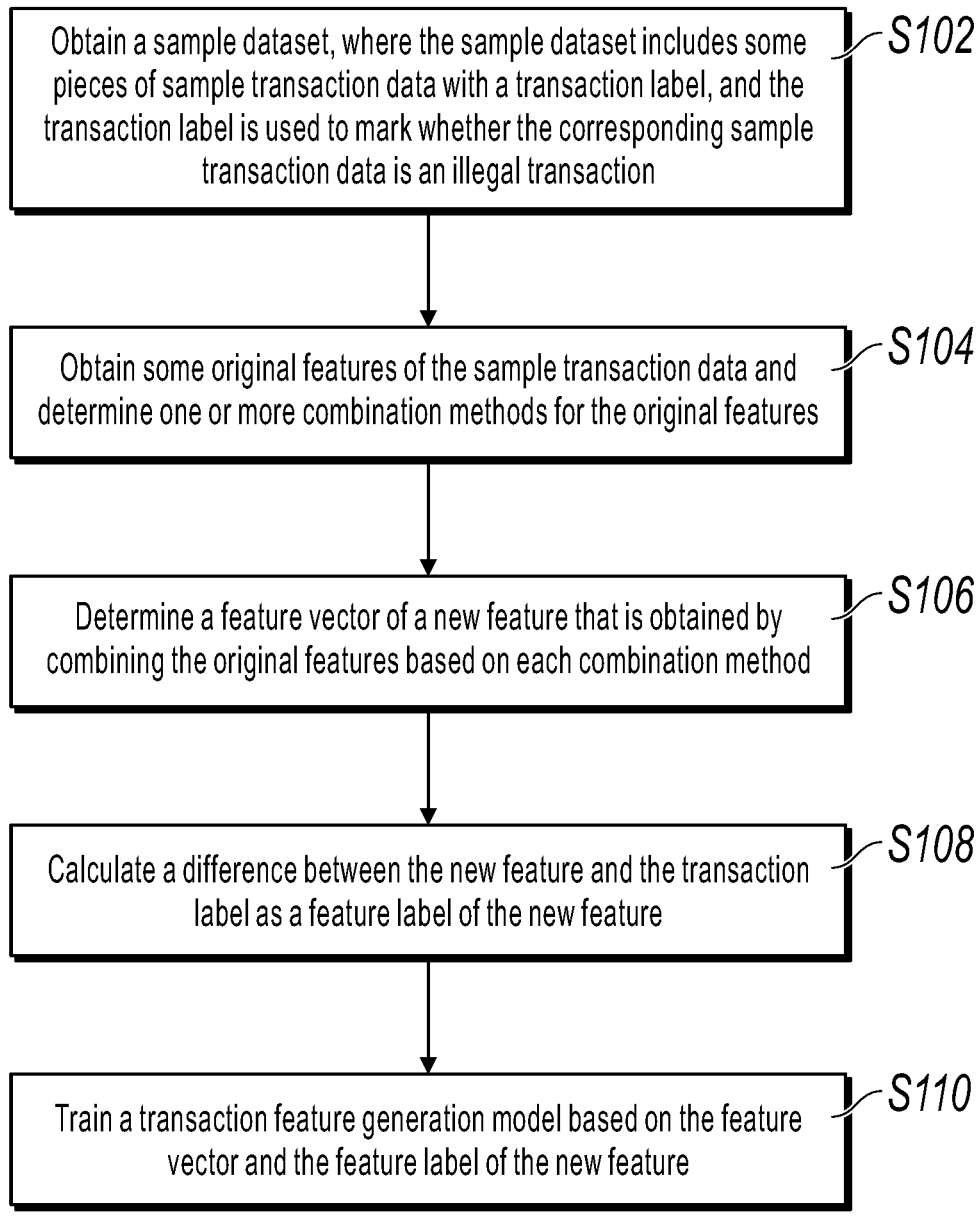
FIG. 1 is a schematic flowchart illustrating a method for training a transaction feature generation model, according to an example implementation of the present specification.

FIG. 1 is a schematic flowchart illustrating a method for training a transaction feature generation model, according to an example implementation of the present specification.

Referring to FIG. 1, the method for training a transaction feature generation model can include the following steps:

Step 102: Obtain a sample dataset, where the sample dataset includes some pieces of sample transaction data with a transaction label, and the transaction label is used to mark whether the corresponding sample transaction data is an illegal transaction.

In the present implementation, transaction data for which illegal transaction identification has been performed can be obtained as sample transaction data with a transaction label. The transaction label is used to mark whether the corresponding sample transaction data is an illegal transaction. The illegal transaction can include a cash-out transaction, a money laundering transaction, etc.

For example, the transaction label "0" can indicate that the corresponding sample transaction data is not an illegal transaction; the transaction label "1" can indicate that the corresponding sample transaction data is an illegal transaction, and so on.

In the present implementation, sample transaction data can be classified based on an application scenario, and sample transaction data in the same application scenario is classified into the same sample dataset.

A certain e-commerce platform is used as an example. Sample transaction data traded by using the e-commerce platform can be classified into sample dataset 1.

A certain consumer credit product is used as another example. Sample transaction data for which payment is made by using the consumer credit product can be classified into sample dataset 2.

In the present implementation, one or more sample datasets can be obtained, which is not specially limited in the present specification.

Step 104: Obtain some original features of the sample transaction data and determine one or more combination methods for the original features.

In the present implementation, the original features are features of the sample transaction data, such as a transaction amount, the number of transactions, a distance between a transaction location and a merchant, a merchant category, a user category, etc.

Types of different original features may be the same or different. For example, the type of the transaction amount is a numeric type, the type of the number of transactions is a numeric type, the type of the merchant category is a string, and the type of the user category is a string, and so on.

The numeric type can be subdivided into a floating-point type and an integer type.

The transaction amount is of the floating-point type, for example, the transaction amount is 108.75 yuan, and so on.

The number of transactions is of the integer type, for example, the number of transactions is 5, and so on.

The present specification does not impose a limitation on the classification of the types of the original features.

For example, the floating-point type and the integer type can be unified into the numeric type without distinction.

For another example, the floating-point type, the integer type, etc. can be used as the types of the original features, and the numeric type is not preserved.

In the present implementation, for ease of feature combination, when original features in the sample dataset are obtained, some original features of the same type can be obtained each time, and the number of the obtained original features can be 2, 3, etc., which is not specially limited in the present specification.

In an example, some original features of the same type can be obtained.

Original features of the floating-point type are used as an example. The original feature "total transaction amount of the user last month" and the original feature "total transaction amount of the user in the same period of last year" can be obtained.

Original features of the integer type are used as an example. The original feature "number of transactions on yesterday" and the original feature "number of transactions on the day before yesterday" can be obtained.

In other examples, when original features of different types can be combined, some original features of different types can be obtained.

For example, the original feature "total transaction amount in the past 30 days" of the floating-point type and the original feature "number of transactions in the past 30 days" of the integer type are obtained.

It is worthwhile to note that, when original features are obtained, if two original features cannot be combined, the two original features will not be obtained at the same time.

For example, the original feature "user category" of the string type and the original feature "number of transactions in the past 30 days" of the integer type will not be obtained at the same time because the two original features cannot be combined.

In the present implementation, for ease of description, some original features obtained each time can be referred to as one original feature group. In the present step, acquisition can be performed multiple times to obtain multiple original feature groups.

It is worthwhile to note that, in the present implementation, original features are usually obtained per sample dataset, and are not obtained across sample datasets. In other words, all original features in each original feature group come from the same sample dataset.

In the present implementation, for each obtained original feature group, a combination method that matches a type of original features can be determined for the original features in the original feature group.

Original features of the numeric type are used as an example. The combination method can include four arithmetic operations such as addition, subtraction, multiplication, and division, logarithmic sum calculation, quadratic sum calculation, and the like operation methods. The combination method can also be first sorting the original features in terms of magnitude, and then abstracting some original features based on the sorting result to perform four arithmetic operations, quadratic sum calculation, or the like operations, which is not specially limited in the present specification.

For example, assume that original features in a certain original feature group are "number of transactions on yesterday" and "number of transactions on the day before yesterday". The combination method can be subtraction. For example, "number of transactions on yesterday" is subtracted by "number of transactions on the day before yesterday" to obtain a difference in the number of transactions.

Original features of the string type are used as an example. The combination method can be an operation on string lengths of the original features, for example, four arithmetic operations on the string lengths. For a specific operation method, references can be made to the combination method for the original features of the numeric type. Details are omitted here for simplicity.

Step 106: Determine a feature vector of a new feature that is obtained by combining the original features based on each combination method.

In the present implementation, for each original feature group obtained in step 104, one new feature can be obtained by combining the original features in the original feature group based on one combination method. Some new features can be obtained by combining the original features in various original feature groups based on various combination methods.

In the present step, a feature vector of each new feature can be determined.

In an example, original features in a sample dataset can be combined based on a combination method, and a value of a new feature obtained through the combination can be used as a feature vector of the new feature.

For example, assume that an original feature group obtained from a certain sample dataset includes two original features of the numeric type: original feature a and original feature b; the combination method is addition; there are 100 pieces of transaction data in total in the sample dataset; values of original feature a are respectively $[a_1, a_2, \ldots, a_{100}]$; values of original feature b are respectively $[b_1, b_2, \ldots, b_{100}]$. Original feature a and original feature b are combined by means of addition, and a feature vector of the obtained new feature a+b can be $[a_1+b_1, a_2+b_2, \ldots, a_{100}+b_{100}]$.

In another example, to reduce a computation amount, the feature vector of the new feature can also be generated based on meta information of the original features and the combination method.

The meta information of the original features can include an average value, a variance, and the number of unique data of the original features in the sample dataset. The meta information of each original feature can form one meta information vector.

A presentation form of the combination method can be a 0/1 vector (Onehot vector), or can be a low-dimension vector obtained by performing embedding processing on the 0/1 vector. The 0/1 vector means that a very long vector is used to represent the combination method. Dimensions of the vector are the total number of the combination methods, and each dimension corresponds to one unique combination method. If a certain combination method is used, an element value of a dimension of the combination method is 1. If a certain combination method is not used, an element value of a dimension of the combination method is 0.

Assume that there are 80 combination methods in total. The 0/1 vector of the combination methods has 80 dimensions, and each dimension corresponds to one unique combination method. The previous addition is still used as an example. In the 80-dimension 0/1 vector, an element value of the dimension corresponding to the addition is 1, and element values of other dimensions are all 0. To be specific, an element value of one element in the 80-dimension 0/1 vector is 1, and element values of the other 79 elements are all 0.

Original feature a and original feature b described above are still used as an example. A feature vector of a new feature can be generated based on a meta information vector of original feature a, a meta information vector of original feature b, and the 0/1 vector of the combination method. For simplicity, these three vectors can be spliced together to obtain the feature vector of the new feature.

In other examples, when there are multiple sample datasets, that is, when the number of sample datasets is greater than 1, the feature vector of the new feature can be generated based on the meta information of the original features, the combination method, and meta features of the sample datasets.

The meta features of the sample datasets can include a ratio (a ratio of positive and negative samples) of an amount of sample transaction data marked as legal transactions to an amount of sample transaction data marked as illegal transactions in the sample datasets, the number of original features, the number of original features of the numeric type, the number of original features of the string type, etc. The meta features of the sample datasets can form one meta feature vector.

In the present example, the meta information vector of the original features, the 0/1 vector of the combination method, and the meta feature vector of the sample datasets can be spliced together to obtain the feature vector of the new feature.

Step 108: Calculate a difference between the new feature and the transaction label as a feature label of the new feature.

In the present implementation, a smaller difference between the new feature obtained through the combination and the transaction label of each piece of sample transaction data can indicate a more reliable new feature obtained. Therefore, in the present example, the difference between the new feature and the transaction label is used as the feature label of the new feature.

In the present implementation, for each piece of sample transaction data in the sample dataset, the value of the new feature of each piece of sample transaction data can be calculated based on the combination method; and then a transaction label of the sample transaction data can be used as a real value, a mean square error between the value of the new feature of the sample transaction data and the real value can be calculated, and the mean square error can be used as the difference between the new feature and the transaction label.

In the present implementation, the feature label of the new feature can be calculated by using the following formula:

$$C = \frac{\sum_{1}^{N}(fab_i - l_i)^2}{N}$$

The combination of original feature a and original feature b is still used as an example. In the previous formula, C represents the feature label of the new feature ab, N represents the number of the sample transaction data in the sample dataset, $fab_i$ represents a value of a new feature ab of an ith piece of sample transaction data, and $l_i$ represents a transaction label of the ith piece of sample transaction data, where a value of i ranges from 1 to N.

In other examples, the difference between the new feature and the transaction label can also be calculated by using algorithms such as Euclidean distance and Mahalanobis distance, which is not specially limited in the present specification.

Step 110: Train the transaction feature generation model based on the feature vector and the feature label of the new feature.

Based on steps 106 and 108, the feature vector of the new feature can be input into the transaction feature generation model, and a prediction result of the new feature can be output. Then, a difference between the prediction result and the feature label of the new feature can be calculated, and parameters of the transaction feature generation model can be adjusted based on the difference to train the transaction feature generation model.

In the present implementation, a machine learning model under supervision can be used as the transaction feature generation model, such as a neural network model, which is not specially limited in the present specification.

Figure 2:
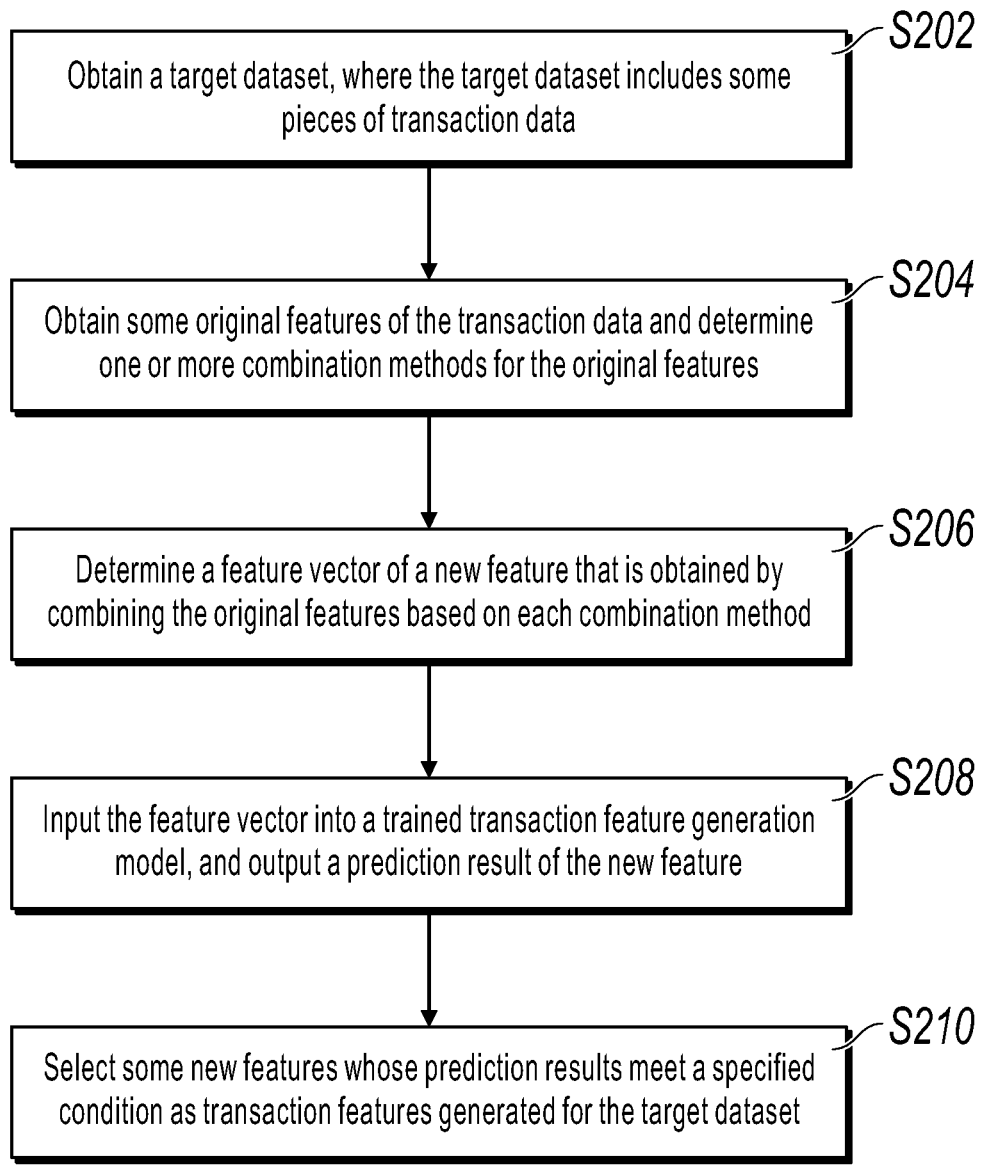
FIG. 2 is a schematic flowchart illustrating a method for generating a transaction feature, according to an example implementation of the present specification.

FIG. 2 is a schematic flowchart illustrating a method for generating a transaction feature, according to an example implementation of the present specification.

Referring to FIG. 2, the method for generating a transaction feature can include the following steps:

Step 202: Obtain a target dataset, where the target dataset includes some pieces of transaction data.

In the present implementation, for a certain application scenario for which illegal transaction identification is needed, transaction data in the application scenario can be obtained to obtain a target dataset.

For example, transaction data for which illegal transaction identification has been performed in the scenario can be obtained to obtain a target dataset. Transaction data in the target dataset has a transaction label.

For another example, when illegal transaction identification has not been performed for the transaction data in the scenario, the transaction data without a transaction label in the scenario can also be obtained to obtain the target dataset, which is not specially limited in the present specification.

The illegal transaction can include a cash-out transaction, a money laundering transaction, etc.

Step 204: Obtain some original features of the transaction data and determine one or more combination methods for the original features.

In the present implementation, the original features are features of the transaction data in the target dataset, such as a transaction amount, the number of transactions, a distance between a transaction location and a merchant, a merchant category, etc.

In the present implementation, some original feature groups can be obtained from the target dataset, each original feature group includes some original features, and a combination method can be determined for original features in each original feature group.

For the method for obtaining the original features and the method for determining the combination method, references can be made to step 104 in the implementation shown in FIG. 1. Details are omitted here for simplicity.

Step 206: Determine a feature vector of a new feature that is obtained by combining the original features based on each combination method.

In the present implementation, for each original feature group obtained in step 204, one new feature can be obtained by combining the original features in the original feature group based on one combination method. Some new features can be obtained by combining the original features in all original feature groups based on various combination methods.

In the present step, a feature vector of each new feature can be determined.

In an example, original features in a sample dataset can be combined based on a combination method, and a value of a new feature obtained through the combination can be used as a feature vector of the new feature.

In another example, the feature vector of the new feature can also be generated based on meta information of the original features and the combination method.

In other examples, when there are multiple sample datasets that are used to train the transaction feature generation model, the feature vector of the new feature can be generated based on the meta information of the original features, the combination method, and meta features of the datasets.

The meta features of the datasets can include the number of original features, the number of original features of the numeric type, the number of original features of the string type, a ratio of positive and negative samples (if any), etc.

For a method for generating the previous feature vector, references can be made to the method for generating a feature vector described in step 106 in the implementation shown in FIG. 1. Details are omitted here for simplicity.

Step 208: Input the feature vector into a trained transaction feature generation model, and output a prediction result of the new feature.

Step 210: Select some new features whose prediction results meet a specified condition as transaction features generated for the target dataset.

In the present implementation, the feature vectors of all new features can be input into the trained transaction feature generation model, and the prediction results of the new features can be output, and then the new features can be sorted in ascending order of the prediction results. Calculation of the difference between the new feature and the transaction label by using the Euclidean distance algorithm is used as an example. A smaller prediction result indicates a smaller difference between the new feature and the transaction label, and a more reliable new feature.

In the present implementation, after the sorting, new features ranked in the first N positions can be selected as the new transaction features generated for the target dataset. A value of N can be predetermined.

In the present implementation, after the newly generated transaction features are determined for the target dataset, illegal transaction identification can be performed for the transaction data in the scenario that the target dataset belongs to, based on the newly generated transaction features.

It can be seen from the previous description that, in the present specification, the original features of the transaction data can be combined to obtain some new features, and then the trained transaction feature generation model is used to predict the new features, and some new features whose prediction results meet the specified condition can be selected as the newly generated transaction features for later illegal transaction identification, thereby automatically generating transaction features and greatly improving transaction feature generation efficiency.

The present specification further provides a feature generation method. New features used for result prediction can be automatically generated based on original features, thereby improving feature generation efficiency.

Figure 3:
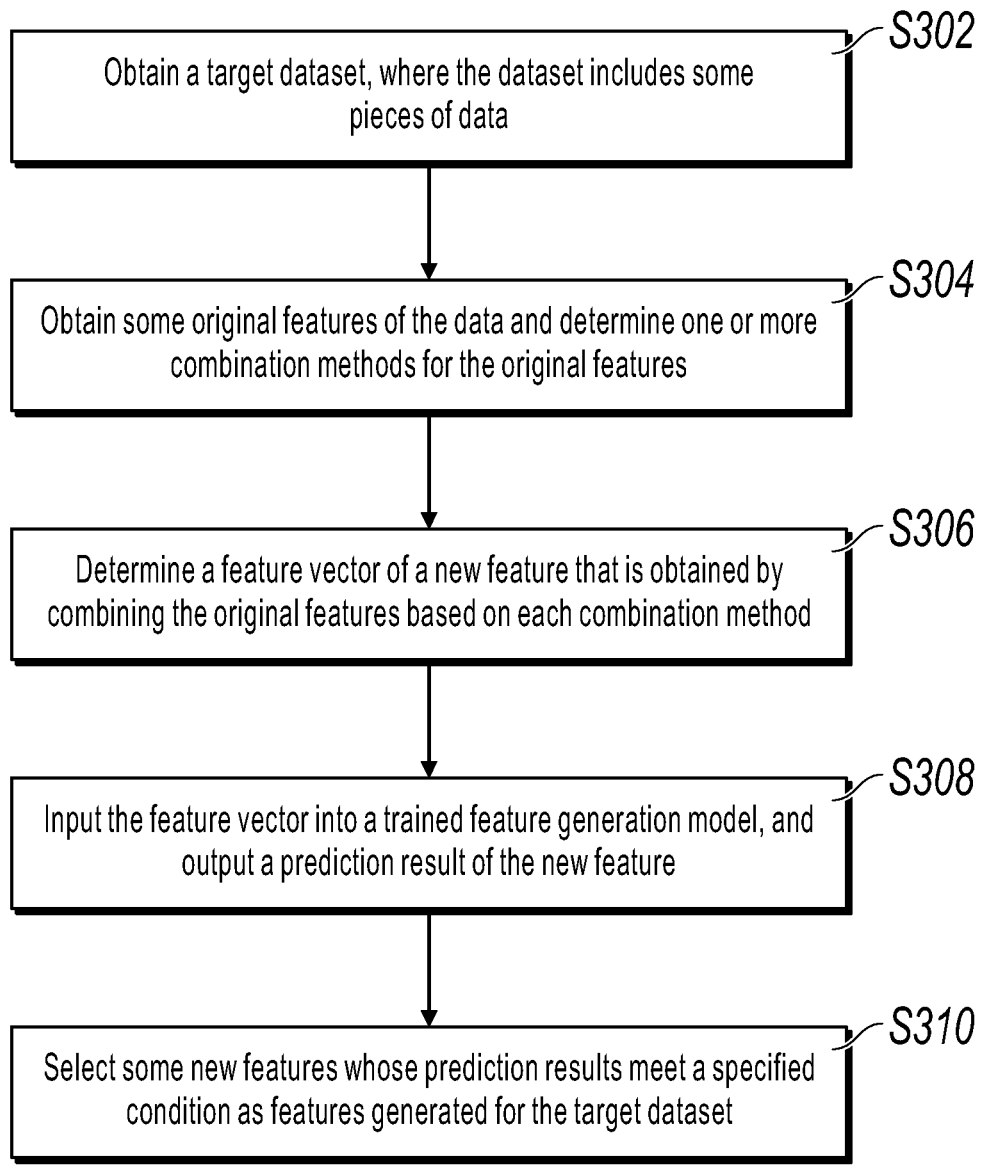
FIG. 3 is a schematic flowchart illustrating a feature generation method, according to an example implementation of the present specification.

Referring to FIG. 3, the feature generation method can include the following steps:

Step 302: Obtain a target dataset, where the dataset includes some pieces of data.

In the present implementation, the target dataset is a dataset for generating a new feature. In different prediction tasks, the data in the target dataset may be different.

For example, in the task of illegal transaction identification, the data in the target dataset can be transaction data, and each piece of transaction data can include original features such as a transaction amount and the number of transactions.

For another example, in the task of commodity recommendation, the data in the target dataset can be user data, and each piece of user data can include original features such as the user's age, the user's gender, the user's purchase history, and the user's browsing history.

For another example, in the task of text classification, the data in the target dataset can be text data, and each piece of text data can include original features such as words and word frequencies included in the corresponding text.

For another example, in the task of risky user identification, the data in the target dataset can be user data, and each piece of user data can include original features such as the user's age, the user's gender, and the user's behavior trajectory.

Step 304: Obtain some original features of the data and determine one or more combination methods for the original features.

In the present implementation, some original features of the same type can be obtained from the original features of the data, and a combination method for these original features can be determined.

Certainly, in other examples, some original features of different types can also be obtained from the original features of the data, and a combination method for these original features can be determined.

For acquisition of the original features and determining of the combination method, references can be made to the acquisition of the original features and the determining of the combination method in the task of generating a transaction feature in the implementation shown in FIG. 2. Details are omitted here for simplicity.

Step 306: Determine a feature vector of a new feature that is obtained by combining the original features based on each combination method.

In the present implementation, for each original feature group obtained in step 304, one new feature can be obtained by combining the original features in the group based on one combination method. Some new features can be obtained by combining the original features in various groups based on various combination methods.

In the present step, a feature vector of each new feature can be determined.

For the method for determining the feature vector, references can be made to the implementation shown in FIG. 1 or FIG. 2. Details are omitted here for simplicity.

Step 308: Input the feature vector into a trained feature generation model, and output a prediction result of the new feature.

Step 310: Select some new features whose prediction results meet a specified condition as features generated for the target dataset.

In the present implementation, the feature generation model can be trained in the same method as the previous feature generation method to obtain a trained feature generation model.

In the training process, the difference between the new feature and the data label can be used as the feature label of the new feature, so as to adjust the parameters of the feature generation model.

For a specific training process, references can be made to the process of training the transaction feature generation model in the transaction feature generation scenario shown in FIG. 1. Details are omitted here for simplicity.

In the present implementation, the feature vectors of all new features can be input into the trained feature generation model, and the prediction results of the new features can be output. Some new features whose prediction results meet a specified condition can be selected for later result prediction for the data.

For example, assume that the prediction task is to perform risk identification for the user to identify a risky user.

One sample or a sample dataset with a user label can be first used to train the feature generation model, to obtain a trained feature generation model. The user label is used to mark whether the corresponding user is a risky user.

For example, the feature generation model can be trained by using sample dataset 1 in a first transaction scenario and sample dataset 2 in a second transaction scenario. Each piece of user data in sample dataset 1 and sample dataset 2 has a user label.

After the trained feature generation model is obtained, for a third transaction scenario for which risky user identification is needed, the target dataset can be obtained from the third transaction scenario. Then, the previous trained feature generation model is used to predict a new feature for the scenario. After the new feature is obtained through prediction, the new feature can be used to predict user data in the third transaction scenario, so as to predict whether the corresponding user is a risky user.

It can be seen from the previous description that, in some implementations, the original features of the data can be combined to obtain some new features, and then the trained feature generation model is used to predict the new features, and some new features whose prediction results meet the specified condition can be selected as the newly generated features for later data prediction, thereby automatically generating features and greatly improving feature generation efficiency.

Corresponding to the previous implementation of the method for generating a transaction feature, the present specification further provides an implementation of an apparatus for generating a transaction feature.

Figure 4:
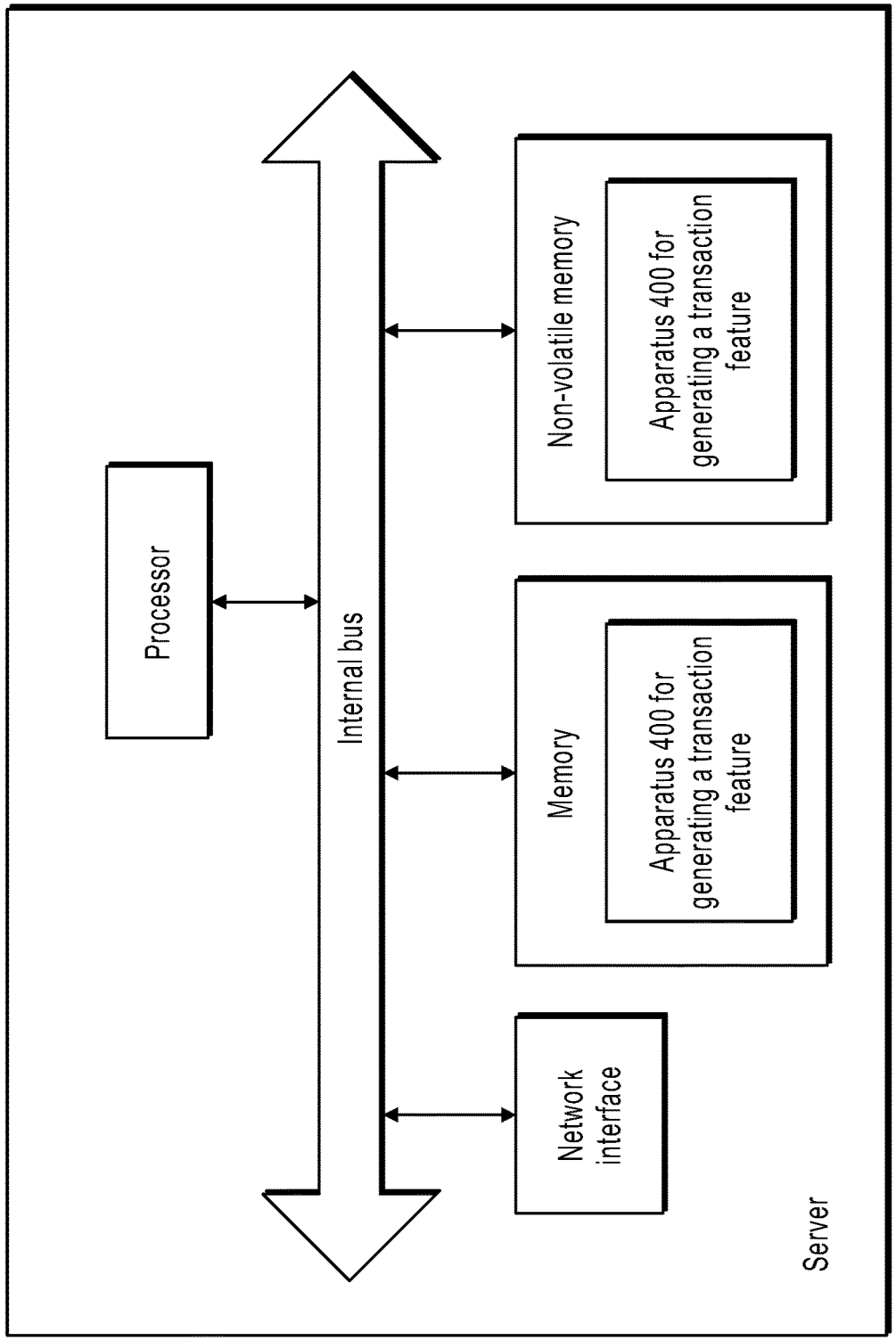
FIG. 4 is a schematic structural diagram illustrating an apparatus for generating a transaction feature, according to an example implementation of the present specification.

The implementation of the apparatus for generating a transaction feature in the present specification can be applied to a server. The apparatus implementation can be implemented by software, or can be implemented by hardware or a combination of software and hardware. For example, the apparatus implementation is implemented by software. A logical apparatus is formed when a processor of a server where the apparatus is located reads a corresponding computer program instruction in a non-volatile memory into the memory for running. In terms of hardware, FIG. 4 is a diagram of a hardware structure of a server in which an apparatus for generating a transaction feature is located, according to the present specification. In addition to the processor, memory, network interface, and non-volatile memory shown in FIG. 4, the server in which the apparatus is located in the implementation generally can further include other hardware based on an actual function of the server. Details are omitted here for simplicity.

Figure 5:
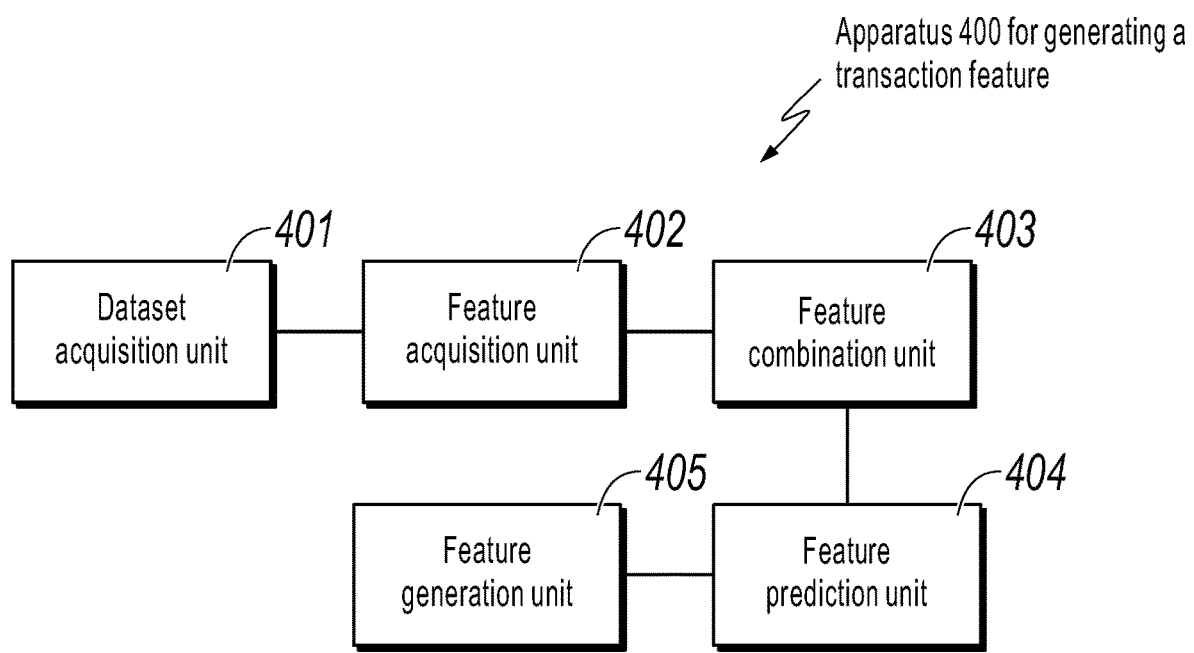
FIG. 5 is a block diagram illustrating an apparatus for generating a transaction feature, according to an example implementation of the present specification.

FIG. 5 is a block diagram illustrating an apparatus for generating a transaction feature, according to an example implementation of the present specification.

Referring to FIG. 5, the apparatus 400 for generating a transaction feature can be applied to the server shown in FIG. 4. The apparatus 400 includes the following: a dataset acquisition unit 401, a feature acquisition unit 402, a feature combination unit 403, a feature prediction unit 404, and a feature generation unit 405.

The dataset acquisition unit 401 is configured to obtain a target dataset, where the target dataset includes some pieces of transaction data.

The feature acquisition unit 402 is configured to obtain some original features of the transaction data and determine one or more combination methods for the original features.

The feature combination unit 403 is configured to determine a feature vector of a new feature that is obtained by combining the original features based on each combination method.

The feature prediction unit 404 is configured to input the feature vector into a trained transaction feature generation model, and output a prediction result of the new feature.

The feature generation unit 405 is configured to select some new features whose prediction results meet a specified condition as transaction features generated for the target dataset.

Optionally, the feature acquisition unit 402 is configured to obtain some original features of the same type in the transaction data; and determine a combination method that matches the type as the combination method for the original features.

Optionally, when the type is a numeric type, the combination method includes one or more of the following: four arithmetic operations, logarithmic sum calculation, or quadratic sum calculation.

Optionally, when the type is a string, the combination method includes one or more of the following: four arithmetic operations of string lengths, a logarithmic sum of string lengths, or a quadratic sum of string lengths.

Optionally, the feature vector is generated based on meta information of the original features and the combination method.

Optionally, the meta information includes one or more of the following: an average value, a variance, or the number of unique data of the original features.

Optionally, when the number of sample datasets for training the transaction feature generation model is greater than 1, the feature vector is generated based on meta information of the original features, the combination method, and meta features of the datasets.

Optionally, the meta features of the datasets include one or more of the following: the number of original features, the number of original features of the numeric type, or a ratio of positive and negative samples.

Corresponding to the previous implementation of the method for training a transaction feature generation model, the present specification further provides an implementation of an apparatus for training a transaction feature generation model.

Figure 6:
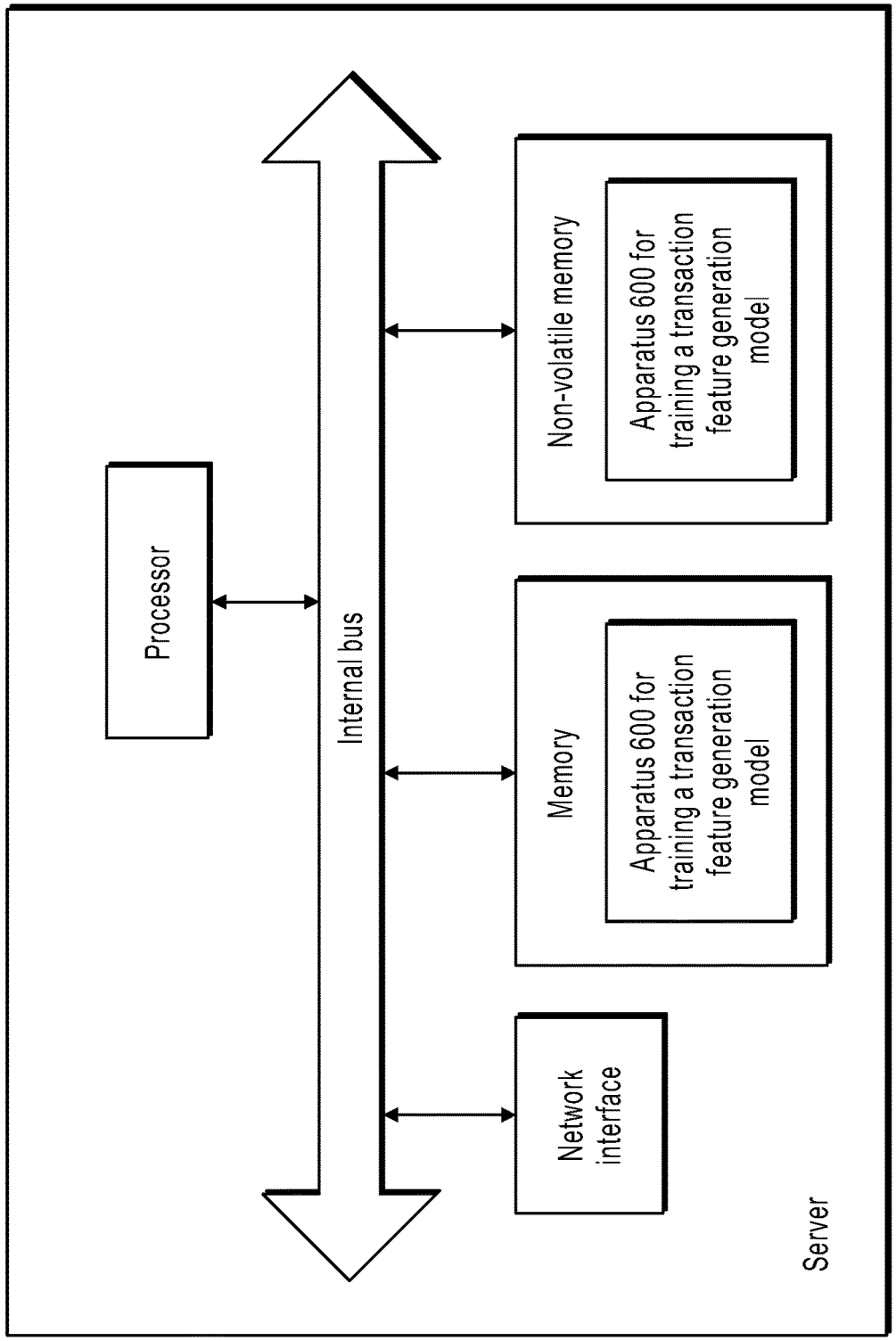
FIG. 6 is a schematic structural diagram illustrating an apparatus for training a transaction feature generation model, according to an example implementation of the present specification.

The implementation of the apparatus for training a transaction feature generation model in the present specification can be applied to a server. The apparatus implementation can be implemented by software, or can be implemented by hardware or a combination of software and hardware. For example, the apparatus implementation is implemented by software. A logical apparatus is formed when a processor of a server where the apparatus is located reads a corresponding computer program instruction in a non-volatile memory into the memory for running. In terms of hardware, FIG. 6 is a diagram of a hardware structure of a server in which an apparatus for training a transaction feature generation model is located, according to the present specification. In addition to the processor, memory, network interface, and non-volatile memory shown in FIG. 6, the server in which the apparatus is located in the implementation generally can further include other hardware based on an actual function of the server. Details are omitted here for simplicity.

Figure 7:
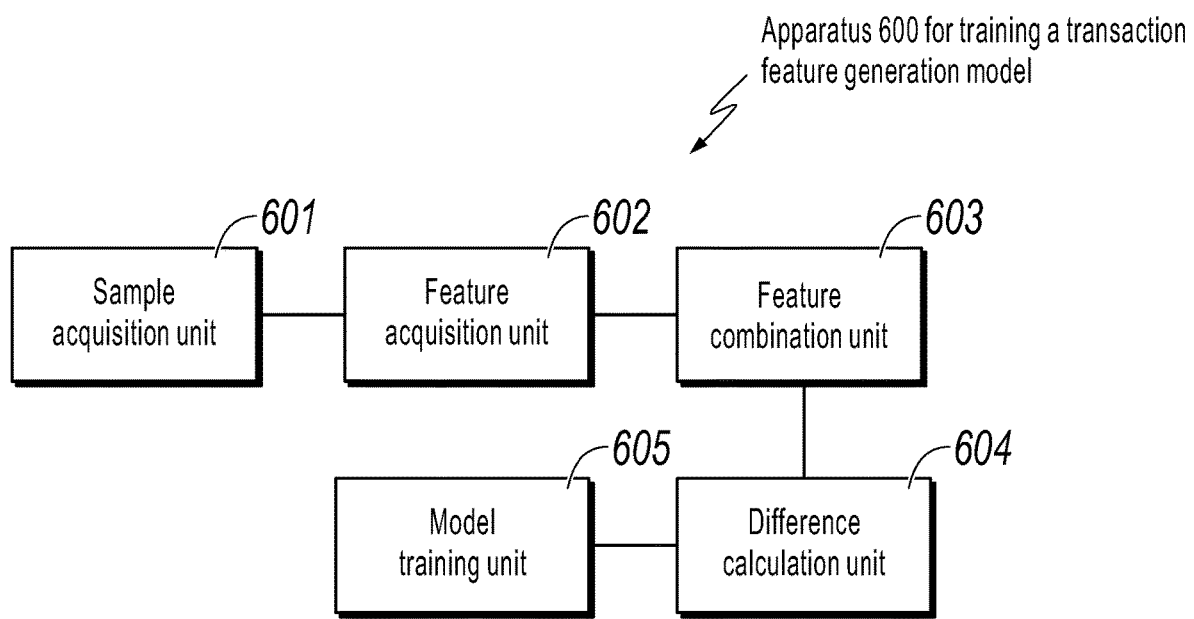
FIG. 7 is a block diagram illustrating an apparatus for training a transaction feature generation model, according to an example implementation of the present specification.

FIG. 7 is a block diagram illustrating an apparatus for training a transaction feature generation model, according to an example implementation of the present specification.

Referring to FIG. 7, the apparatus 600 for training a transaction feature generation model can be applied to the server shown in FIG. 6. The apparatus 600 includes the following: a sample acquisition unit 601, a feature acquisition unit 602, a feature combination unit 603, a difference calculation unit 604, and a model training unit 605.

The sample acquisition unit 601 is configured to obtain a sample dataset, where the sample dataset includes some pieces of sample transaction data with a transaction label, and the transaction label is used to mark whether the corresponding sample transaction data is an illegal transaction.

The feature acquisition unit 602 is configured to obtain some original features of the sample transaction data and determine one or more combination methods for the original features.

The feature combination unit 603 is configured to determine a feature vector of a new feature that is obtained by combining the original features based on each combination method.

The difference calculation unit 604 is configured to calculate a difference between the new feature and the transaction label as a feature label of the new feature.

The model training unit 605 is configured to train the transaction feature generation model based on the feature vector and the feature label of the new feature.

Optionally, the difference calculation unit 604 is configured to: for each piece of sample transaction data in the sample dataset, calculate a value of a new feature of the sample transaction data based on the combination method; and use a transaction label of the sample transaction data as a real value, calculate a mean square error between the value of the new feature of the sample transaction data and the real value, and use the mean square error as the difference between the new feature and the transaction label.

For an implementation process of functions and roles of each unit in the apparatus, references can be made to an implementation process of corresponding steps in the previous method. Details are omitted here for simplicity.

Because an apparatus implementation corresponds to a method implementation, for related parts, references can be made to related descriptions in the method implementation. The previously described apparatus implementation is merely an example. The units described as separate parts can or cannot be physically separate, and parts displayed as units can or cannot be physical units, can be located in one position, or can be distributed on multiple network units. Some or all of the modules can be selected depending on an actual demand to achieve the objectives of the solutions of the present specification. A person of ordinary skill in the art can understand and implement the implementations of the present specification without creative efforts.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previous implementation of the method for generating a transaction feature, the present specification further provides an apparatus for generating a transaction feature. The apparatus includes the following: a processor; and a memory, configured to store a machine executable instruction. The processor and the memory are usually interconnected by using an internal bus. In other possible implementations, the device can further include an external interface to communicate with other devices or components.

In the present implementation, by reading and executing a machine executable instruction that is stored in the memory and corresponds to generation logic of the transaction feature, the processor is enabled to perform the following operations: obtaining a target dataset, where the target dataset includes some pieces of transaction data; obtaining some original features of the transaction data and determining one or more combination methods for the original features; determining a feature vector of a new feature that is obtained by combining the original features based on each combination method; inputting the feature vector into a trained transaction feature generation model, and outputting a prediction result of the new feature; and selecting some new features whose prediction results meet a specified condition as transaction features generated for the target dataset.

Optionally, the obtaining some original features of the transaction data includes the following: obtaining some original features of the same type in the transaction data; and the determining a combination method for the original features includes the following: determining a combination method that matches the type as the combination method for the original features.

Optionally, when the type is a numeric type, the combination method includes one or more of the following: four arithmetic operations, logarithmic sum calculation, or quadratic sum calculation.

Optionally, when the type is a string, the combination method includes one or more of the following: four arithmetic operations of string lengths, a logarithmic sum of string lengths, or a quadratic sum of string lengths.

Optionally, the feature vector is generated based on meta information of the original features and the combination method.

Optionally, the meta information includes one or more of the following: an average value, a variance, or the number of unique data of the original features.

Optionally, when the number of sample datasets for training the transaction feature generation model is greater than 1, the feature vector is generated based on meta information of the original features, the combination method, and meta features of the datasets.

Optionally, the meta features of the datasets include one or more of the following: the number of original features, the number of original features of the numeric type, or a ratio of positive and negative samples.

Corresponding to the previous implementation of the method for training a transaction feature generation model, the present specification further provides an apparatus for training a transaction feature generation model. The apparatus includes the following: a processor; and a memory, configured to store a machine executable instruction. The processor and the memory are usually interconnected by using an internal bus. In other possible implementations, the device can further include an external interface to communicate with other devices or components.

In the present implementation, by reading and executing a machine executable instruction that is stored in the memory and corresponds to training logic of the transaction feature generation model, the processor is enabled to perform the following operations: obtaining a sample dataset, where the sample dataset includes some pieces of sample transaction data with a transaction label, and the transaction label is used to mark whether the corresponding sample transaction data is an illegal transaction; obtaining some original features of the sample transaction data and determining one or more combination methods for the original features; determining a feature vector of a new feature that is obtained by combining the original features based on each combination method; calculating a difference between the new feature and the transaction label as a feature label of the new feature; and training the transaction feature generation model based on the feature vector and the feature label of the new feature.

Optionally, the obtaining some original features of the sample transaction data includes the following: obtaining some original features of the same type in the sample transaction data; and the determining a combination method for the original features includes the following: determining a combination method that matches the type as the combination method for the original features.

Optionally, the calculating a difference between the new feature and the transaction label includes the following: for each piece of sample transaction data in the sample dataset, calculating a value of a new feature of the sample transaction data based on the combination method; and using a transaction label of the sample transaction data as a real value, calculating a mean square error between the value of the new feature of the sample transaction data and the real value, and using the mean square error as the difference between the new feature and the transaction label.

Corresponding to the previous implementation of the method for generating a transaction feature, the present specification further provides a computer readable storage medium, where the computer readable storage medium stores a computer program, and the program is executed by a processor to perform the following steps: obtaining a target dataset, where the target dataset includes some pieces of transaction data; obtaining some original features of the transaction data and determining one or more combination methods for the original features; determining a feature vector of a new feature that is obtained by combining the original features based on each combination method; inputting the feature vector into a trained transaction feature generation model, and outputting a prediction result of the new feature; and selecting some new features whose prediction results meet a specified condition as transaction features generated for the target dataset.

Optionally, the obtaining some original features of the transaction data includes the following: obtaining some original features of the same type in the transaction data; and the determining a combination method for the original features includes the following: determining a combination method that matches the type as the combination method for the original features.

Optionally, when the type is a numeric type, the combination method includes one or more of the following: four arithmetic operations, logarithmic sum calculation, or quadratic sum calculation.

Optionally, when the type is a string, the combination method includes one or more of the following: four arithmetic operations of string lengths, a logarithmic sum of string lengths, or a quadratic sum of string lengths.

Optionally, the feature vector is generated based on meta information of the original features and the combination method.

Optionally, the meta information includes one or more of the following: an average value, a variance, or the number of unique data of the original features.

Optionally, when the number of sample datasets for training the transaction feature generation model is greater than 1, the feature vector is generated based on meta information of the original features, the combination method, and meta features of the datasets.

Optionally, the meta features of the datasets include one or more of the following: the number of original features, the number of original features of the numeric type, or a ratio of positive and negative samples.

Corresponding to the previous implementation of the method for training a transaction feature generation model, the present specification further provides a computer readable storage medium, where the computer readable storage medium stores a computer program, and the program is executed by a processor to perform the following steps: obtaining a sample dataset, where the sample dataset includes some pieces of sample transaction data with a transaction label, and the transaction label is used to mark whether the corresponding sample transaction data is an illegal transaction; obtaining some original features of the sample transaction data and determining one or more combination methods for the original features; determining a feature vector of a new feature that is obtained by combining the original features based on each combination method; calculating a difference between the new feature and the transaction label as a feature label of the new feature; and training the transaction feature generation model based on the feature vector and the feature label of the new feature.

Optionally, the obtaining some original features of the sample transaction data includes the following: obtaining some original features of the same type in the sample transaction data; and the determining a combination method for the original features includes the following: determining a combination method that matches the type as the combination method for the original features.

Optionally, the calculating a difference between the new feature and the transaction label includes the following: for each piece of sample transaction data in the sample dataset, calculating a value of a new feature of the sample transaction data based on the combination method; and using a transaction label of the sample transaction data as a real value, calculating a mean square error between the value of the new feature of the sample transaction data and the real value, and using the mean square error as the difference between the new feature and the transaction label.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

The previous descriptions are merely example implementations of the present specification, but are not intended to limit the present specification. Any modification, equivalent replacement, or improvement made without departing from the spirit and principle of the present specification shall fall within the protection scope of the present specification.

What is claimed is:

1. A computer-implemented method for evaluating combination transaction features, the method comprising:
    obtaining a target dataset, wherein the target dataset comprises transaction data;
    obtaining transaction feature vectors having respective values for a plurality of original features represented in the transaction data;
    processing the transaction feature vectors to train a transaction feature generation model that generates a predicted feature label for a new feature represented by a feature vector, including, for each new feature of a plurality of new features, performing operations comprising:
        determining, for the new feature, a respective combination method for a respective original feature group comprising a plurality of the original features of the transaction data;
        generating values of the new feature by combining corresponding values of the plurality of the original features based on the respective combination method;
        computing the feature label for the new feature based on a sum of differences between the values of the new feature and corresponding transaction labels;
        providing the feature vector for the new feature as a first input to the transaction feature generation model to obtain a prediction result corresponding to the feature label, and
        updating parameters of the transaction feature generation model based on a difference between the prediction result and the feature label for the new feature;
    receiving another new feature having a second combination method;
    computing a second feature vector for the other new feature according to the second combination method;
    providing the second feature vector for the other new feature as a second input to the transaction feature generation model to obtain a second prediction result for the other new feature;
    evaluating the other new feature relative to one or more additional new features using the second prediction result for the other new feature;
    selecting, based on the evaluation, the other new feature as a new transaction feature for training a model to classify transactions; and
    using the other new feature to train the model to classify transactions having original feature values including using the second combination method of the other new feature to combine original feature values of the transactions.

2. The method according to claim 1, further comprising:
    obtaining the original features from the transaction data wherein two or more of the original features obtained from the transaction data are of a first data type; and
    wherein determining the respective combination method for the respective original feature group comprises:
    determining a combination method that matches the first data type as the respective combination method for the respective original feature group.

3. The method according to claim 2, wherein
    when the first data type is a numeric type, the respective combination method comprises one or more of the following:
    an arithmetic operation, logarithmic sum calculation, or quadratic sum calculation.

4. The method according to claim 2, wherein
    when the first data type is a string, the respective combination method comprises one or more of the following:
    an arithmetic operation of string lengths, a logarithmic sum of string lengths, or a quadratic sum of string lengths.

5. The method according to claim 1, wherein
    the second feature vector is generated based on meta information of the original features and the second combination method.

6. The method according to claim 5, wherein the meta information comprises one or more of the following:
    an average value, a variance, or a number of unique data of the original features.

7. The method according to claim 1, wherein computing the second feature vector comprises:
    computing the second feature vector based on meta information of the original features, the second combination method, and meta features of two or more sample datasets used to train the transaction feature generation model.

8. The method according to claim 7, wherein the meta features of the two or more sample datasets comprise one or more of the following:
    a number of original features, a number of original features of a numeric type, or a ratio of positive and negative samples.

9. The method according to claim 1, wherein the second combination method combines features of a same type as the respective combination method.

10. The method according to claim 1, wherein the differences between the values of the new feature and the corresponding transaction labels comprise a mean square error between a first value of the values of the new feature and a first transaction label of the corresponding transaction labels.

11. A non-transitory, computer-readable medium storing one or more instructions executable by a computer system to perform operations comprising:
    obtaining a target dataset, wherein the target dataset comprises transaction data;

obtaining transaction feature vectors having respective values for a plurality of original features represented in the transaction data;

processing the transaction feature vectors to train a transaction feature generation model that generates a feature label for a new feature represented by a feature vector, including, for each new feature of a plurality of new features, performing other operations comprising:

determining, for the new feature, a respective combination method for a respective original feature group comprising a plurality of the original features of the transaction data;

generating values of the new feature by combining corresponding values of the plurality of the original features based on the respective combination method;

computing the feature label for the new feature based on a sum of differences between the values of the new feature and corresponding transaction labels;

providing the feature vector for the new feature as a first input to the transaction feature generation model to obtain a prediction result corresponding to the feature label, and updating parameters of the transaction feature generation model based on a difference between the prediction result and the feature label for the new feature;

receiving another new feature having a second combination method;

computing a second feature vector for the other new feature according to the second combination method;

providing the second feature vector for the other new feature as a second input to the transaction feature generation model to obtain a second prediction result for the other new feature;

evaluating the other new feature relative to one or more additional new features using the second prediction result for the other new feature;

selecting, based on the evaluation, the other new feature as a new transaction feature for training a model to classify transactions; and using the other new feature to train the model to classify transactions having original feature values including using the second combination method of the other new feature to combine original feature values of the transactions.

12. The non-transitory, computer-readable medium of claim 11, wherein the operations further comprise:

obtaining the original features from the transaction data wherein two or more of the original features obtained from the transaction data are of a first data type; and wherein determining the respective combination method for the respective original feature group comprises:

determining a combination method that matches the first data type as the respective combination method for the respective original feature group.

13. The non-transitory, computer-readable medium of claim 11, wherein the second combination method combines features of a same type as the respective combination method.

14. The non-transitory, computer-readable medium of claim 11, wherein the differences between the values of the new feature and the corresponding transaction labels comprise a mean square error between a first value of the values of the new feature and a first transaction label of the corresponding transaction labels.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

obtaining a target dataset, wherein the target dataset comprises transaction data;

obtaining transaction feature vectors having respective values for a plurality of original features represented in the transaction data;

processing a the transaction feature vectors to train a transaction feature generation model that generates a feature label for a new feature represented by a feature vector, including, for each new feature of a plurality of new features, performing other operations comprising:

determining, for the new feature, a respective combination method for a respective original feature group comprising a plurality of the original features of the transaction data;

generating values of the new feature by combining corresponding values of the plurality of the original features of the original feature group based on the respective combination method;

computing the feature label for the new feature based on a sum of differences between the values of the vector new feature and corresponding transaction labels;

providing the feature vector for the new feature as a first input to the transaction feature generation model to obtain a prediction result corresponding to the feature label, and updating parameters of the transaction feature generation model based on a difference between the prediction result and the feature label for the new feature;

receiving another new feature having a second combination method;

computing a second feature vector for the other new feature according to the second combination method;

providing the second feature vector for the other new feature as a second input to the transaction feature generation model to obtain a second prediction result for the other new feature;

evaluating the other new feature relative to one or more additional new features using the second prediction result for the other new feature;

selecting, based on the evaluation, the other new feature as a new transaction feature for training a model to classify transactions; and using the other new feature to train the model to classify transactions having original feature values including using the second combination method of the other new feature to combine original feature values of the transactions.

16. The computer-implemented system of claim 15, wherein the operations further comprise:

obtaining the original features from the transaction data wherein two or more of the original features obtained from the transaction data are of a first data type; and wherein determining the respective combination method for the respective original feature group comprises:

determining a combination method that matches the first data type as the respective combination method for the respective original feature group.

17. The computer-implemented system of claim 15, wherein the second combination method combines features of a same type as the respective combination method.

* * * * *

UNITED STATES PATENT AND TRADEMARK OFFICE
CERTIFICATE OF CORRECTION

PATENT NO. : 11,210,673 B2
APPLICATION NO. : 16/803150
DATED : December 28, 2021
INVENTOR(S) : Longfei Li It is certified that error appears in the above-identified patent and that said Letters Patent is hereby corrected as shown below:

On the Title Page

Column 2, (item (56) Foreign Patent Documents), Line 1, delete "GN" insert -- CN --.

Column 2, (item (56) Foreign Patent Documents), Line 2, delete "GN" insert -- CN --.

Column 2, (item (56) Foreign Patent Documents), Line 3, delete "GN" insert -- CN --.

In the Claims

Column 17, Lines 33-34, in Claim 1, after "generates a" delete "predicted".

Column 20, Line 14, in Claim 15, after "processing" delete "a".

Column 20, Line 25, in Claim 15, after "features" delete "of the original feature group".

Column 20, Line 29, in Claim 15, before "new" delete "vector".

Signed and Sealed this
Nineteenth Day of April, 2022

Katherine Kelly Vidal
*Director of the United States Patent and Trademark Office*